No. 807,068. PATENTED DEC. 12, 1905.
W. FETZER.
FERTILIZER DISTRIBUTER.
APPLICATION FILED SEPT. 12, 1905.

Witnesses:
Jas. E. Hutchinson
Thos. R. Heath

Inventor:
William Fetzer,
By Bacon & Milans, Attorneys

UNITED STATES PATENT OFFICE.

WILLIAM FETZER, OF MIDDLETOWN, OHIO.

FERTILIZER-DISTRIBUTER.

No. 807,068.  Specification of Letters Patent.  Patented Dec. 12, 1905.

Application filed September 12, 1905. Serial No. 278,116.

*To all whom it may concern:*

Be it known that I, WILLIAM FETZER, a citizen of the United States, residing at Middletown, in the county of Butler and State of Ohio, have invented certain new and useful Improvements in Fertilizer-Distributers, of which the following is a specification, reference being had therein to the accompanying drawings.

This invention relates to an improvement in fertilizer-distributers, and more particularly to that class of fertilizer-distributers wherein the feeding of the fertilizer to the delivery tube or chute is accomplished by rotating the fertilizer-hopper over an apertured base-plate, the delivery of the fertilizer to the aperture in the base-plate being regulated by a stationary cap or shell arranged within the hopper over said aperture.

The object of the present invention is the provision of means for regulating the admission of the fertilizer to the stationary cap or shell, and consequently the regulation of the discharge of the fertilizer through the delivery tube or chute.

A further object of the invention is the provision of regulating means of this character which will offer the least resistance to the feed of the fertilizer and thereby lessen the tendency of the fertilizer to clog at the entrance to the stationary cap or shell.

Other objects of the invention will be apparent from the detailed description hereinafter when read in connection with the accompanying drawings, wherein a preferable embodiment of my invention is shown and wherein like letters of reference refer to similar parts in the several views.

Figure 1:
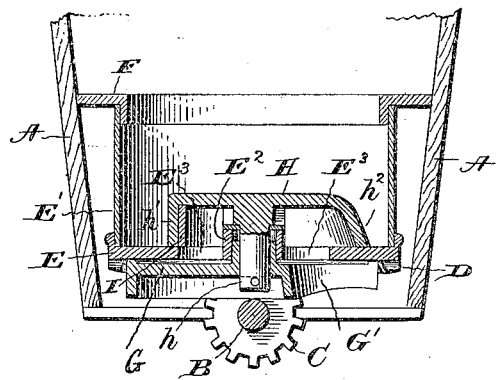
Figure 2:
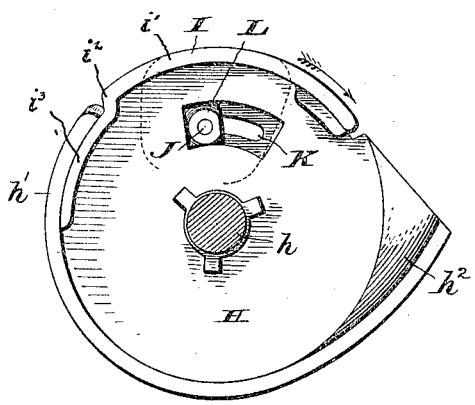
Figure 3:
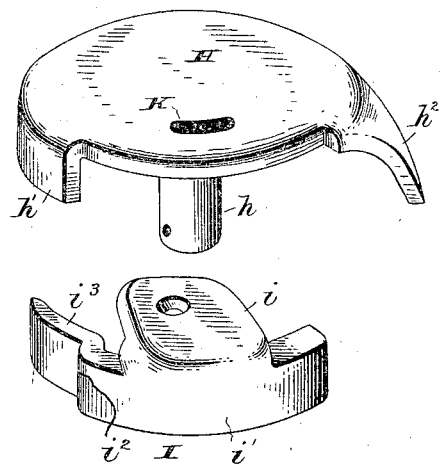

In the drawings, Figure 1 is a transverse section through the hopper of my improved fertilizer-distributer. Fig. 2 is a bottom plan view of the stationary cap or shell, and Fig. 3 is a perspective view with the regulating-slide detached.

Referring now more particularly to the drawings, A designates the usual box or casing, in the lower portion of which is journaled the longitudinally-disposed shaft B, which carries a pinion C, which meshes with the teeth D, arranged upon the bottom E of the hopper-cup E', which rotates within the box or casing A. A plate F is secured in the box or casing A, which is provided with a circular aperture therein and a downwardly-extending flange surrounding said aperture, which projects into the upper portion of the hopper-cup E'. The hopper-cup E' rotates upon a stationary base-plate G, which is provided with a discharge-opening G', from which leads the delivery tube or chute, which may be of any suitable construction. While I have shown the box or casing A as provided with but one hopper-cup, it is obvious that as many may be employed as desired.

The bottom E of the hopper is provided with a centrally-disposed hub $E^2$, which loosely encircles an upwardly-extending apertured projection projecting from the central portion of the base-plate G, and with a plurality of apertures $E^3$, which serve to convey the fertilizer to the discharge-opening G' when the hopper is rotated.

H designates a cap or shell, which is arranged within the hopper and is designed to cover the discharge-opening G' in the base-plate G. The cap H is secured in position by a stem $h$, which extends downwardly from the top thereof and passes through the upwardly-extending apertured projection in the central portion of the base-plate, to which it is rigidly secured in any suitable manner. The cap H is substantially circular in configuration and is provided with a downwardly-extending flange $h'$, extending partially therearound, the lower edge of which extends into close proximity to the upper surface of the bottom E of the rotating hopper. One end of the flange $h'$ is flared outwardly to form the lip $h^2$, which directs the fertilizer into the interior of the cap H upon the rotation of the hopper-cup E. Secured to the cap H, between the lip $h^2$ and the opposite end of the flange $h'$, is a gate I, which can be adjusted to regulate the amount of fertilizer admitted to the interior of the cap H. The gate I comprises the flat portion $i$, which is adapted to be secured to the top of the cap H and the downwardly-extending curved portion $i'$, which forms substantially a continuation of the rim $h'$ when the gate is secured in position upon the cap. One end of the curved portion of the gate is slightly offset, as at $i^2$, to form a tailpiece $i^3$, which engages the interior portion of the flange $h'$, said tailpiece being long enough to always lie behind the end of the flange $h'$, regardless of the position to which the gate I may be adjusted. The gate I is secured to the cap by means of a screw J, which passes through an aperture in the flat portion $i$ thereof and through a segmental slot K, formed in the upper portion of the cap H, a nut L being secured to the inner end of said screw. The nut L is seated in a segmental depression formed in the under side of the top of the cap H and is normally prevented from rotating by the wall thereof.

From the above description it will be apparent that by loosening the screw J the gate I can be moved to cause one end thereof to approach or recede from the lip $h^2$, thereby forming a large or small opening for the admission of the fertilizer to the interior of the cap H. It will of course be obvious that when the gate I has been adjusted to the desired position screw J will be tightened to secure the same. It will be noted that as the gate I forms substantially a continuation of the flange of the cap and is adjustable in the direction of the feed of the fertilizer there will be no tendency for the fertilizer to clog and choke up at the point where it enters the cap. Furthermore, as the gate I offers no resistance to the feed of the fertilizer it is not apt to become broken or disarranged when heavy fertilizers are used.

I do not desire to limit myself to the precise form and construction shown in the drawings, as it is obvious that many minor changes might be made thereto without departing from the spirit of the invention.

What I claim as my invention, and desire to secure by Letters Patent, is—

1. In a fertilizer-distributer, the combination of a rotary hopper, of a stationary cap, and means adjustable relatively to the cap and in the direction of feed of the fertilizer for regulating the admission of fertilizer to said cap.

2. In a fertilizer-distributer, a discharging device comprising a substantially circular cap provided with a tangentially-disposed opening leading thereinto, and a circumferentially-adjustable gate carried by the cap for varying the size of said opening.

3. In a fertilizer-distributer, a discharging device comprising a cap provided with a downwardly-extending flange extending partially therearound and a gate secured to said cap and adjustable to vary the distance between the ends of said flange.

4. In a fertilizer-distributer, a discharging device comprising a cap provided with a downwardly-extending flange extending partially therearound, one end of said flange being flared outwardly to form a lip, and a gate extending from the opposite end of said flange and adjustable toward and from said lip.

5. In a fertilizer-distributer, a discharging device comprising a cap provided with a flange extending partially therearound, one edge of said flange being flared outwardly to form a lip, and a gate adjustably secured to said cap and arranged to form substantially a continuation of the opposite end of said flange.

6. In a fertilizer-distributer, a discharging device comprising a cap provided with a downwardly-extending flange extending partially therearound, a gate secured to said cap and forming substantially a continuation of one end of said flange, and means for adjusting said gate toward and from the opposite end of said flange.

7. In a fertilizer-distributer, a discharging device comprising a substantially circular cap provided with a flange extending partially therearound, and a gate adjustably secured to said cap, said gate being provided at one end with an offset tailpiece adapted to engage the inner side of a portion of said flange.

8. In a fertilizer-distributer, a discharging device comprising a substantially circular cap provided with a downwardly-extending flange partially therearound, one end of said flange being flared outwardly to form a lip, and a circumferentially-adjustable gate extending from the opposite end of said flange.

In testimony whereof I affix my signature in presence of two witnesses.

WILLIAM FETZER.

Witnesses:
G. A. SULLIVAN,
FLOYD CLISE.